US012306571B2

(12) United States Patent
Ozawa et al.

(10) Patent No.: US 12,306,571 B2
(45) Date of Patent: May 20, 2025

(54) STRUCTURE AND IMAGE FORMING APPARATUS

(71) Applicant: KYOCERA Document Solutions Inc., Osaka (JP)

(72) Inventors: Hiroki Ozawa, Osaka (JP); Koichiro Tsujimoto, Osaka (JP); Yoshiki Aoyama, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/394,967

(22) Filed: Dec. 22, 2023

(65) Prior Publication Data

US 2024/0210871 A1 Jun. 27, 2024

(30) Foreign Application Priority Data

Dec. 27, 2022 (JP) ................................ 2022-209234

(51) Int. Cl.
*G03G 21/16* (2006.01)

(52) U.S. Cl.
CPC ................................ *G03G 21/1619* (2013.01)

(58) Field of Classification Search
CPC ........... G03G 21/1619; G03G 21/1642; G03G 21/1647
See application file for complete search history.

(56) References Cited

U.S. PATENT DOCUMENTS 6,259,872 B1 7/2001 Fukunaga et al.

FOREIGN PATENT DOCUMENTS

JP 2000138470 A 5/2000

*Primary Examiner* — Thomas S Giampaolo, II
(74) *Attorney, Agent, or Firm* — Alleman Hall & Tuttle LLP

(57) ABSTRACT

A structure includes a plurality of joined square pipes. Four corner portions of each of the plurality of square pipes include three first corner portions and one second corner portion. The three first corner portions are formed by bending a single metal plate. The one second corner portion includes two edge portions of the metal plate and a welded portion where the two edge portions are joined.

4 Claims, 3 Drawing Sheets

STRUCTURE AND IMAGE FORMING APPARATUS

INCORPORATION BY REFERENCE

This application is based upon and claims the benefit of priority from the corresponding Japanese Patent Application No. 2022-209234 filed on Dec. 27, 2022, the entire contents of which are incorporated herein by reference.

BACKGROUND

The present disclosure relates to a structure including a plurality of joined square pipes, and an image forming apparatus including the structure.

The image forming apparatus includes a sheet storing portion, a printing portion, and the like. The image forming apparatus further includes a structure on which the sheet storing portion and the printing portion are mounted.

For example, it is known that the structure is composed of a plurality of square pipes joined by welding. Such a structure has high strength.

Each of the square pipes is manufactured by bending and welding a single metal plate. Therefore, each of the square pipes has a welded portion formed along the longitudinal direction.

SUMMARY

A structure according to one aspect of the present disclosure includes a plurality of joined square pipes. Four corner portions of each of the plurality of square pipes include three first corner portions formed by bending a single metal plate, and one second corner including two edge portions of the metal plate and a welded portion where the two edge portions are joined.

An image forming apparatus according to another aspect of the present disclosure includes the structure and a printing portion mounted on the structure and configured to form an image on a sheet.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

An embodiment of the present disclosure will be described below with reference to the drawings. It is noted that the following embodiment is an example of embodying the present disclosure and does not limit the technical scope of the present disclosure.

[Configuration of Image Forming Apparatus 10]

Figure 1:
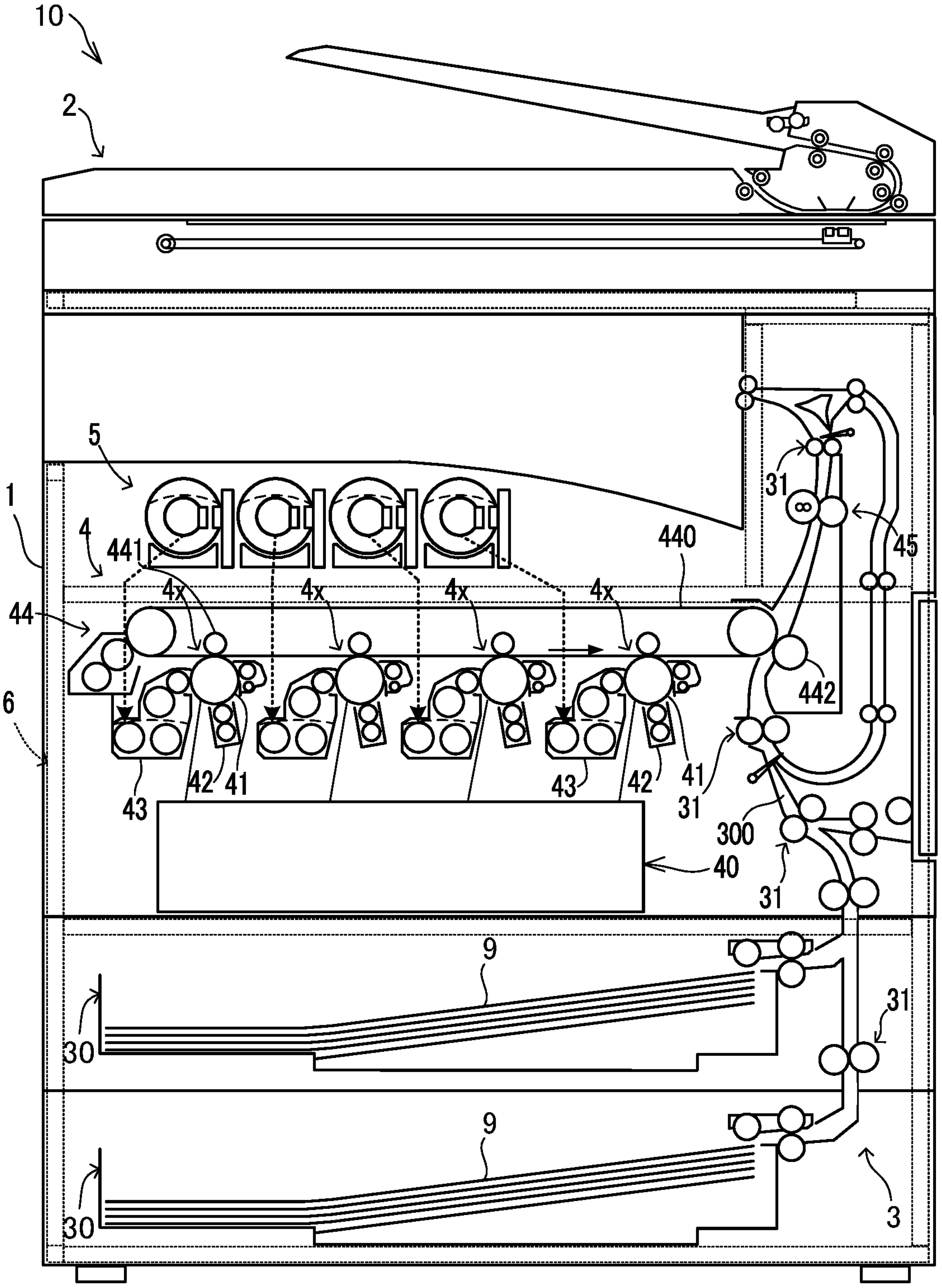
FIG. 1 is a configuration diagram of an image forming apparatus including a structure according to an embodiment.

A structure 6 according to the embodiment is employed in an image forming apparatus 10. As shown in FIG. 1, the image forming apparatus 10 includes a main body unit 1 and an image reading unit 2.

The main body unit 1 includes a sheet storing portion 30, a sheet conveying device 3, a printing portion 4, one or more developer containers 5, and a structure 6. The image reading unit 2 is connected to the top of the main body unit 1. The image reading unit 2 is a device that reads an image of a document sheet.

The sheet storing portion 30 houses a plurality of sheets 9. The sheet conveying device 3 feeds the sheets 9 in the sheet storing portion 30 one by one to a sheet conveying path 300. Further, the sheet conveying device 3 conveys the sheets 9 along the sheet conveying path 300.

The sheet conveying device 3 includes a plurality of conveying roller pairs 31 each of which conveys each of the sheets 9 by rotating.

The printing portion 4 is a device that forms an image on each of the sheets 9 conveyed by the sheet conveying device 3. In the example shown in FIG. 1, the printing portion 4 forms an image on each of the sheets 9 using an electrophotographic method.

The electrophotographic printing portion 4 includes a laser scanning unit 40, one or more image forming portions 4*x*, a transfer device 44, and a fixing device 45.

In the example shown in FIG. 1, the printing portion 4 is a tandem type color image printing device. Therefore, the printing portion 4 includes four image forming portions 4*x* respectively corresponding to toners of four colors. The image forming apparatus 10 further includes four developer containers 5 corresponding to the four image forming portions 4*x*.

In each of the image forming portions 4*x*, a drum-shaped photoconductor 41 rotates, and a charging device 42 charges the outer peripheral surface of the photoconductor 41. In each of the image forming portions 4*x*, the laser scanning unit 40 writes an electrostatic latent image on the outer peripheral surface of the photoconductor 41, and a developing device 43 develops the electrostatic latent image into a toner image.

In the transfer device 44, an intermediate transfer belt 440 rotates in contact with the four photoconductors 41, and four primary transfer devices 441 each transfer the toner image onto the intermediate transfer belt 440. Further, a secondary transfer device 442 transfers the toner image on the intermediate transfer belt 440 to each of the sheets 9 conveyed along the sheet conveying path 300.

The fixing device 45 heats and presses the toner image transferred to each of the sheets 9, thereby fixing the toner image on each of the sheets 9. The sheet conveying device 3 discharges each of the sheets 9 with the image formed thereon from the sheet conveying path 300.

Each of the developer containers 5 supplies toner to the corresponding developing device 43. The toner is an example of the developer. It is noted that the image forming portion 4 may be a device that forms an image on each of the sheets 9 by an inkjet method or another method.

The structure 6 houses and supports the sheet storing portion 30, the sheet conveying device 3, the printing portion 4, and the developer containers 5. The image reading unit 2 is connected to the top of the structure 6.

Figure 2:
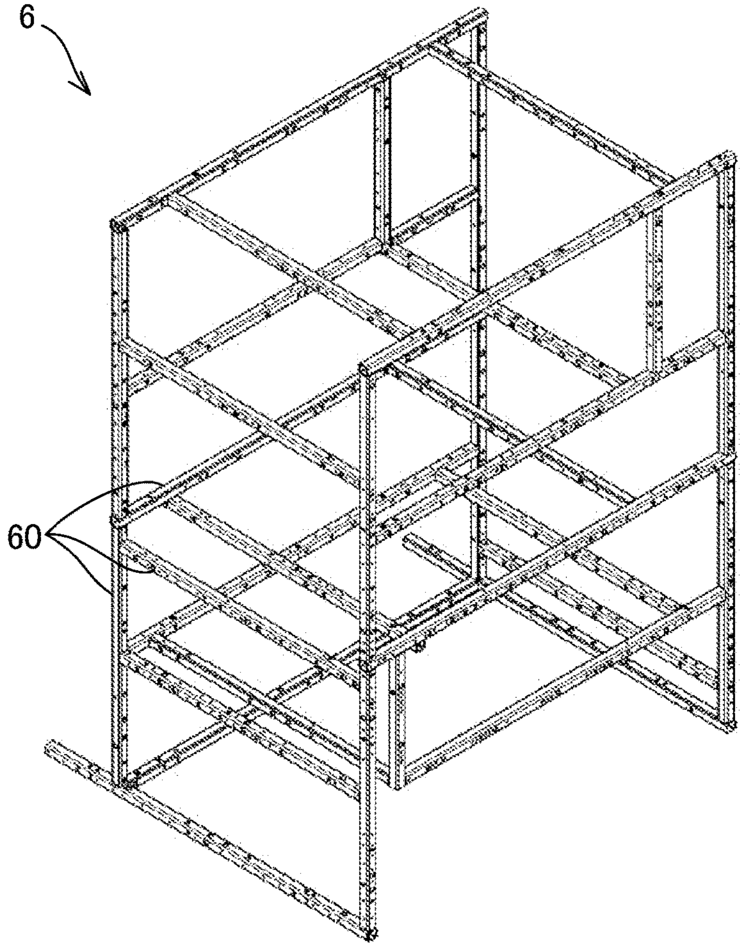
FIG. 2 is a perspective view of the structure according to the embodiment.

The structure 6 includes a plurality of square pipes 60 joined by welding (see FIG. 2). Such a structure 6 has high strength.

Each of the square pipes 60 is manufactured by bending and welding a single metal plate. Therefore, each of the square pipes 60 has a welded portion 65 formed along the longitudinal direction (see FIG. 4).

Figure 5:
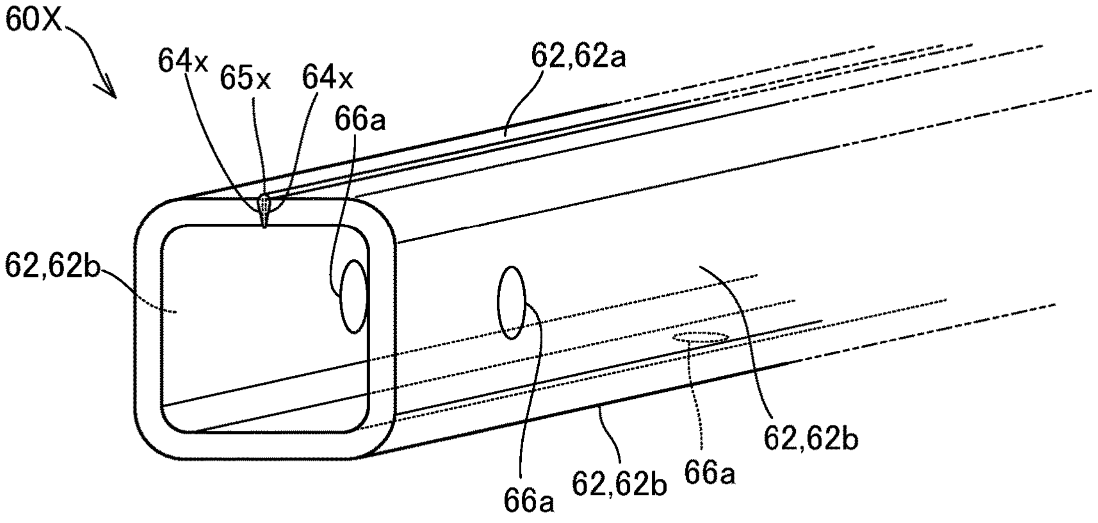
FIG. 5 is a perspective view of one of square pipes according to a reference example.

By the way, a welded portion 65*x* of a square pipe 60X according to a reference example shown in FIG. 5 is formed on one of four side surfaces 62 of the square pipe 60X. The square pipe 60X is used for a conventional structure.

That is, one of the four side surfaces 62 of the conventional square pipe 60X is a joint side surface 62*a* which includes the welded portion 65*x* (see FIG. 5). The remaining three of the four side surfaces 62 are normal side surfaces 62*b* which do not include the welded portion 65*x*.

The processing of mounting holes 66*a* for mounting various components on the square pipe 60X is performed on a flat metal plate before being bent. On the other hand, it is difficult to performing the processing of the mounting holes 66*a* on the joint side surface 62*a* of the square pipe 60X with high accuracy.

Therefore, in the conventional image forming apparatus, the joint side surface 62*a* of the square pipe 60X is not used as the mounting surface on which a component is directly mounted by a bolt or a screw.

In addition, when a specific component is welded to the joint side surface 62*a*, a welding work line and an assembly work line for assembling another component to the square pipe 60X using a bolt or the like need to be separately provided in the manufacturing line of the apparatus. Therefore, it is not preferable to weld the specific component to the joint side surface 62*a*.

In addition, a connecting member for connecting the specific component to a normal side surface 62*b* of the square pipe 60X may be used. In this case, the number of components and the number of mounting steps increase as compared with the case where the component is directly mounted on one of the side surfaces 62 of the square pipe 60X.

In contrast, the structure 6 has a configuration for using the four side surfaces 62 of each of the plurality of square pipes 60 for mounting components. Hereinafter, a configuration of the structure 6 will be described.

[Structure 6]

As shown in FIG. 2, the structure 6 is composed of a plurality of square pipes 60 joined by welding. The structure 6 is an integral member of a plurality of metal square pipes 60 connected by welding.

It is noted that the structure 6 may include a metal panel (not shown) welded to one or more of the plurality of square pipes 60.

In the following description, one of two square pipes 60 joined by welding in the structure 6 will be referred to as a first square pipe 60*a*, and the other will be referred to as a second square pipe 60*b* (see FIG. 3). That is, the plurality of square pipes 60 include one or more first square pipes 60*a* and one or more second square pipes 60*b* joined by welding.

Figure 3:
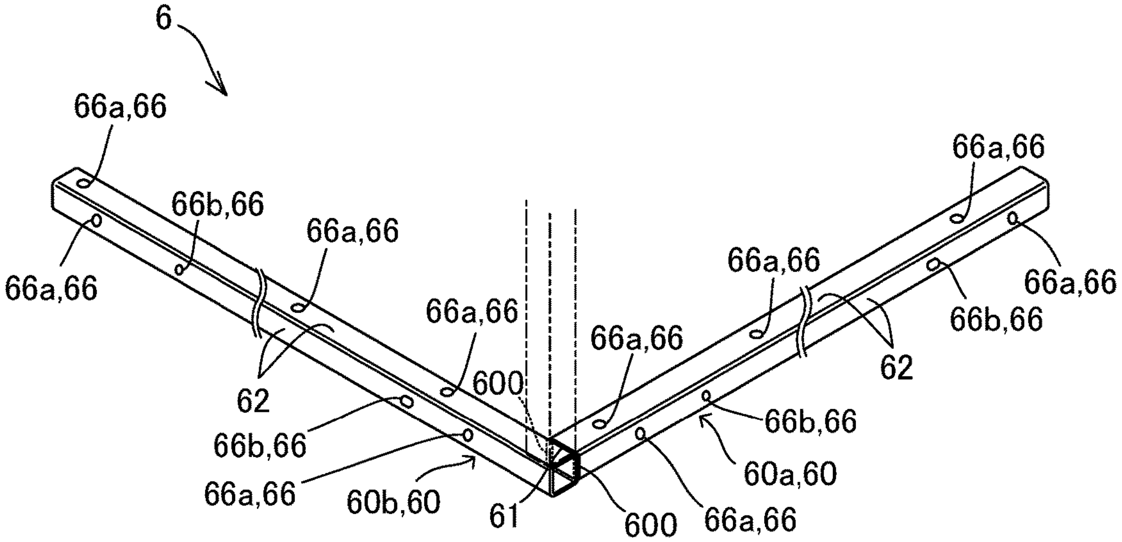
FIG. 3 is a perspective view of two joined square pipes in the structure according to the embodiment.

FIG. 3 is a perspective view of the first square pipe 60*a* and the second square pipe 60*b*. As shown in FIG. 3, an end surface 61 of the first square pipe 60*a* is joined by welding to one of the four side surfaces 62 of the second square pipe 60*b*.

For example, two parallel sides of the four sides forming an end surface 61 of the first square pipe 60*a* are joined by welding to a side surface 62 of the second square pipe 60*b*.

That is, two parallel sides of the four sides forming an end surface 61 of the first square pipe 60*a* are joined to one of the side surfaces 62 of the second square pipe 60*b* by a welded portion 600. The welded portion 600 is a portion where a part of the first square pipe 60*a* and a part of the second square pipe 60*b* are fused.

[Configuration of Each Square Pipe 60]

Figure 4:
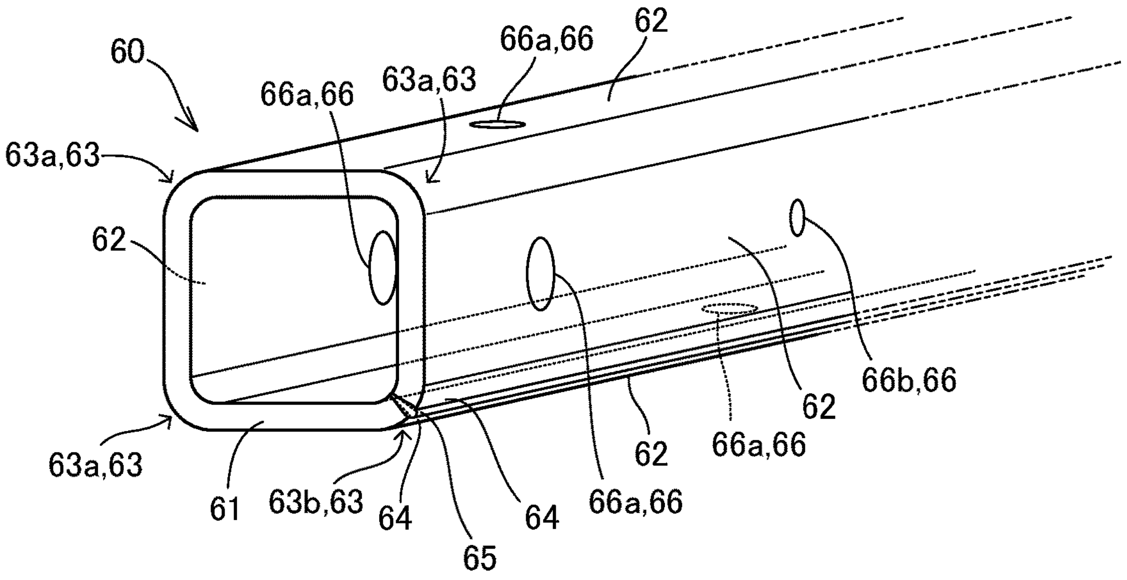
FIG. 4 is a perspective view of one of the square pipes in the structure according to the embodiment.

The square pipes 60 each have four side surfaces 62 and four corner portions 63 (see FIG. 4). The four side surfaces 62 and the four corner portions 63 are formed to extend in the longitudinal direction of each of the square pipes 60.

The four corner portions 63 include three first corner portions 63*a* and one second corner portion 63*b*. The three first corner portions 63*a* are three bent portions formed by bending a single metal plate. The second corner portion 63*b* includes two edge portions 64 of the metal plate and a welded portion 65 where the two edge portions 64 are joined.

The two edge portions 64 and the welded portion 65 are formed to extend in the longitudinal direction of each of the square pipes 60.

Each of the square pipes 60 has one or more through holes 66 formed in one or more of the four side surfaces 62 (see FIG. 3 and FIG. 4). The processing of the plurality of through holes 66 in the plurality of square pipes 60 is performed on a flat metal plate before being bent.

In each of the square pipes 60, none of the four side surfaces 62 includes the welded portion 65. Therefore, it is easy to form one or more through holes 66 in each of the four side surfaces 62 of each of the square pipes 60.

For example, four or more through holes 66 are formed in the four side surfaces 62 of at least one of the plurality of square pipes 60 (see FIG. 4).

In the present embodiment, the plurality of through holes 66 include a plurality of mounting holes 66*a* and a plurality of positioning holes 66*b*. The mounting hole 66*a* is used for mounting a component. For example, the component is directly mounted on one of the side surfaces 62 of each of the square pipes 60 by a fixing member, such as a bolt or a screw, which is inserted into the mounting hole 66*a*.

In the present embodiment, the image reading unit 2, the sheet conveying device 3, and the printing portion 4 are mounted on the structure 6 by the fixing member inserted into the mounting hole 66*a*.

It is conceivable that two or more of the plurality of square pipes 60 may be of the same type of member for commonality of components. In this case, some of the plurality of mounting holes 66*a* may not be used for mounting components in some of the plurality of square pipes 60 of the same type.

On the other hand, the positioning holes 66*b* are holes into which a plurality of protrusions of a positioning jig (not shown) are fitted when the plurality of square pipes 60 are joined by welding.

The plurality of protrusions of the positioning jig are fitted into the positioning holes 66*b* of the plurality of square pipes 60, whereby the plurality of square pipes 60 are positioned with high accuracy.

Since the square pipe 60 as shown in FIG. 4 is employed in the structure 6, all of the four side surfaces 62 of each of the square pipes 60 can be used for mounting components.

In the present embodiment, the three first corner portions 63*a* form a chamfered shape. In addition, the two edge portions 64 of the second corner portion 63*b* are bent to form a chamfered shape.

In each of the square pipes 60, the welded portion 65 may be formed so as to slightly protrude from the gap between the two edge portions 64. Even in such a case, the two edge portions 64 form a chamfered shape, so that the welded portion 65 does not interfere with the component mounted on one of the side surfaces 62.

Similarly, when the end surface 61 of the first square pipe 60*a* is joined by welding to one of the four side surfaces 62 of the second square pipe 60*b*, the welded portion 65 does not interfere with the end surface 61 of the first square pipe 60*a*.

It is noted that the structure 6 may be applied to apparatuses other than the image forming apparatus 10.

[Appendixes to Disclosure]

The following are appendixes to the overview of the disclosure extracted from the above embodiment. It is noted that the structures and processing functions to be described in the following appendixes can be selected and combined arbitrarily.

<Appendix 1>

A structure comprising a plurality of joined square pipes, wherein four corner portions of each of the plurality of square pipes include:

three first corner portions formed by bending a single metal plate; and one second corner portion including two edge portions of the metal plate and a welded portion where the two edge portions are joined.

<Appendix 2>

The structure according to Appendix 1, wherein four or more through holes are formed in four side surfaces of at least one of the plurality of square pipes.

<Appendix 3>

The structure according to Appendix 1 or Appendix 2, wherein the two edge portions of the metal plate in each of the plurality of square pipes are bent to form a chamfered shape.

<Appendix 4>

An image forming apparatus comprising:

the structure according to any one of Appendix 1 to Appendix 3; and a printing portion mounted on the structure and configured to form an image on a sheet.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A structure for an image forming apparatus, the structure comprising a plurality of joined square pipes, wherein four corner portions of each of the plurality of square pipes include:

three first corner portions formed by bending a single metal plate; and one second corner portion including two edge portions of the metal plate and a welded portion where the two edge portions are joined, and four or more through holes are formed in four side surfaces of at least one of the plurality of square pipes.

2. An image forming apparatus comprising:

the structure according to claim 1; and a printing portion mounted on the structure and configured to form an image on a sheet.

3. A structure for an image forming apparatus, the structure comprising a plurality of joined square pipes, wherein four corner portions of each of the plurality of square pipes include:

three first corner portions formed by bending a single metal plate; and one second corner portion including two edge portions of the metal plate and a welded portion where the two edge portions are joined, and the two edge portions of the metal plate in each of the plurality of square pipes are bent to form a chamfered shape.

4. An image forming apparatus comprising:

the structure according to claim 3; and a printing portion mounted on the structure and configured to form an image on a sheet.

* * * * *